US 11,753,534 B2

(12) United States Patent
Briggs et al.

(10) Patent No.: US 11,753,534 B2
(45) Date of Patent: Sep. 12, 2023

(54) COMPATIBILIZATION OF POST CONSUMER RESINS

(71) Applicant: EQUISTAR CHEMICALS, LP, Houston, TX (US)

(72) Inventors: Nicholas M. Briggs, Cincinnati, OH (US); Ryan Kramb, Monroe, OH (US); Bryan S. Schley, Cincinnati, OH (US); Timothy J. Skillman, Maineville, OH (US); Jeffrey J. Strebel, Cincinnati, OH (US); Jeanine A. Smith, Maineville, OH (US); David C. Holliman, Maineville, OH (US); Rocio S. Garay, Cincinnati, OH (US); Gilles Jobin, Quebec (CA)

(73) Assignee: Equistar Chemicals, LP, Houston, TX (US)

(*) Notice: Subject to any disclaimer, the term of this patent is extended or adjusted under 35 U.S.C. 154(b) by 36 days.

(21) Appl. No.: 17/527,949

(22) Filed: Nov. 16, 2021

(65) Prior Publication Data

US 2022/0177681 A1 Jun. 9, 2022

Related U.S. Application Data

(60) Provisional application No. 63/226,895, filed on Jul. 29, 2021, provisional application No. 63/114,342, filed on Nov. 16, 2020.

(51) Int. Cl.
*C08L 23/12* (2006.01)
*C08L 23/06* (2006.01)
(Continued)

(52) U.S. Cl.
CPC ............... *C08L 23/12* (2013.01); *C08L 23/06* (2013.01); *B29C 43/003* (2013.01);
(Continued)

(58) Field of Classification Search
CPC .... C08L 23/12; C08L 23/16; C08L 2205/025; C08L 23/06; C08L 2207/02; C08L 2207/062; C08L 2207/20
See application file for complete search history.

(56) References Cited

U.S. PATENT DOCUMENTS

2006/0235139 A1* 10/2006 Garagnani .............. C08L 23/10
524/515
2017/0044359 A1* 2/2017 Kahlen .................... C08L 23/12
(Continued)

FOREIGN PATENT DOCUMENTS

WO 2018206353 A1 11/2018

OTHER PUBLICATIONS

International Search Report and Written Opinion dated Apr. 29, 2022 (Apr. 29, 2022) For Corresponding PCT/US2021/059546.

*Primary Examiner* — Mark S Kaucher

(57) ABSTRACT

Compositions comprising post-consumer recycled (PCR) waste are described. The PCR is combined with at least one virgin resin and a propylene-based compatibilizer that enhances the blend between the PCR and virgin resin as well as improving one or more physical properties of the composition. The propylene-based compatibilizer is a reactor made thermoplastic polyolefin or a heterophasic copolymer with a semi-crystalline matrix and a rubber component. This allows for the selection of a compatibilizer that can shift the composition's physical properties based on the end use application, and provide a stronger, miscible blend.

36 Claims, 1 Drawing Sheet

(51) Int. Cl.
    *B29C 43/00*        (2006.01)
    *B29K 23/00*        (2006.01)
(52) U.S. Cl.
    CPC ..... *B29K 2023/12* (2013.01); *C08L 2205/025* (2013.01); *C08L 2205/035* (2013.01); *C08L 2205/08* (2013.01); *C08L 2205/12* (2013.01); *C08L 2207/062* (2013.01); *C08L 2207/20* (2013.01)

(56) References Cited

U.S. PATENT DOCUMENTS

2018/0015647 A1* 1/2018 Kramb .................... C08L 23/16
2018/0179371 A1* 6/2018 Cavalieri ................ C08L 23/12
2018/0215846 A1* 8/2018 Kulshreshtha ........ C08F 210/16

* cited by examiner

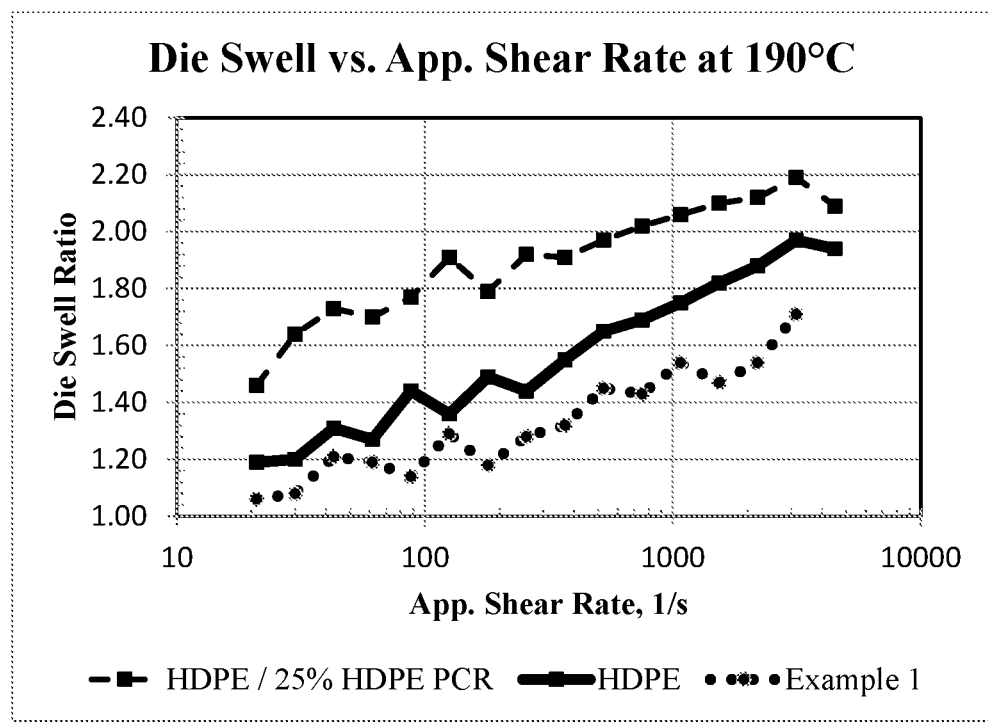

COMPATIBILIZATION OF POST CONSUMER RESINS

PRIOR RELATED APPLICATIONS

This application is the Non-Provisional Patent Application, which claims benefit of priority to U.S. Provisional Application No. 63/114,342, filed Nov. 16, 2020 and U.S. Provisional Application No. 63/226,895, filed Jul. 29, 2021, the contents of which are incorporated herein by reference in their entirety.

FEDERALLY SPONSORED RESEARCH STATEMENT

Not applicable.

REFERENCE TO MICROFICHE APPENDIX

Not applicable.

FIELD OF THE DISCLOSURE

The disclosure relates to generally to recycled post-consumer polymer resins.

BACKGROUND OF THE DISCLOSURE

Heightened standards of living and increased urbanization have led to an increased demand for polymer products, particularly polyolefin plastics. Polyolefins have been frequently used in commercial plastics applications because of their outstanding performance and cost characteristics. Polyethylene (PE), for example, has become one of the most widely used and recognized polyolefins because it is strong, extremely tough, and very durable. This allows for it to be highly engineered for a variety of applications. Similarly, polypropylene (PP) is mechanically rugged yet flexible, is heat resistant, and is resistant to many chemical solvents like bases and acids. Thus, it is ideal for various end-use industries, mainly for packaging and labeling, textiles, plastic parts and reusable containers of various types.

The downside to the demand for polyolefin plastics is the increase in waste. Post-consumer plastic waste typically ends up in landfills, with about 12% being incinerated and about 9% being diverted to recycling. In landfills, most plastics do not degrade quickly, becoming a major source of waste that overburdens the landfill. Incineration is also not an ideal solution to treating the plastic wastes as incineration leads to the formation of carbon dioxide and other greenhouse gas emissions. As such, there has been much interest in developing methods of recycling plastic waste to reduce the burden on landfills while being environmentally friendly.

A drawback to the recycling of plastic wastes is the difficulty in successfully producing commercially usable or desirable products. Plastic waste recycling currently includes washing the material and mechanically reprocessing. As post-consumer plastic waste has often undergone stress cracking, or been exposed to repeated heating cycles or UV light before being recycled, reprocessed materials have a reduction in mechanical properties compared to the virgin materials. While recycled materials are easily used for items like plastic bags and disposable packaging, the pellets may be undesirable for most uses requiring safety, strength, or performance.

Thus, there exists a continued need for the development of compositions that utilize recycled post-consumer polyolefin waste for the production of commercially usable products.

SUMMARY OF THE DISCLOSURE

The present disclosure is directed to polyolefin compositions comprising post-consumer recycled (PCR) polyolefin resins. In particular, the compositions combine PCR polyolefin resins with virgin polyolefin resins and at least one propylene-based compatibilizer resin The compatibilizer resins utilized in the presently described compositions are reactor made thermoplastics or heterophasic copolymers (HECO) that have two components: A) polypropylene homopolymers and/or polypropylene copolymers having small amounts (<10%) of ethylene or $C_4$-$C_{10}$ α-olefins; and B) a rubber that can be a biopolymer or terpolymer with monomers comprising propylene, ethylene, and/or other α-olefin co-monomers. The propylene-based compatibilizer resin not only enhances the dispersion of the PCR and virgin resins, but it also imparts improved impact resistance as well as the ability to adjust the impact to stiffness ratio.

The present disclosure includes any of the following embodiments in any combination(s) of one or more thereof:

A composition comprising a virgin resin having a first polyolefin; a post-consumer recycled resin having a second polyolefin; a polypropylene-based compatibilizer, wherein the polypropylene-based compatibilizer has a semi-crystalline matrix and a rubber component.

Any of the herein described compositions, wherein first polyolefin and the second polyolefin are different polyolefins. Any of the herein described compositions, wherein first polyolefin and the second polyolefin are the same polyolefins.

Any of the herein described compositions, wherein the first polyolefin or the second polyolefin is a polyolefin such as polyethylene or polypropylene. Any of the herein described compositions, wherein first polyolefin and the second polyolefin are both polypropylene.

Any of the herein described compositions, wherein a flexural modulus of the composition is between about 155 to about 300 kPSI, alternatively from about 160 to about 300 kPSI, alternatively about 170 to about 300 kPSI, alternatively between about 170 to about 270 kPSI, alternatively between about 200 to about 270 kPSI; and a notched Izod Impact at 73° F. of the composition is between about 0.4 to about 12 ft-lb/in, alternatively between about 0.4 to about 1.5 ft-lb/in.

Any of the herein described compositions, wherein the virgin resin is present in an amount of about 20 to about 80 wt. %, alternatively from about 30 to about 80 wt. %.

Any of the herein described compositions, wherein the post-consumer recycled resin is present in an amount of about 5 to about 50 wt. %, alternatively from about 5 to about 40 wt. %.

Any of the herein described compositions, wherein the polypropylene-based compatibilizer is present in an amount of about 10 to about 50 wt. %, alternatively from about 10 to about 35 wt. %.

Any of the herein described compositions, wherein the polypropylene-based compatibilizer comprises: (A) 70% of a semi-crystalline matrix comprising (AI) from 25% to 75% by weight, based upon the total weight of (A), of a propylene polymer having a melt flow rate MFRI of 1.2 g/10 min; and (AII) from 25% to 75% by weight, based upon the total weight of (A), of a propylene polymer having a melt flow rate value MFRII of 73 g/10 min; wherein the ratio MFRII/MFRI is 60 and the propylene polymers (AI) and (AII) are independently selected from the group consisting of a propylene homopolymer, a random copolymer of propylene containing up to 3% of ethylene, and a random copolymer of propylene containing up to 6% of at least one $C_4$-$C_{10}$ alpha-olefin and optionally up to 3% of ethylene; the amounts of (AI) and (AII) being referred to the total weight of (AI) and (AII) wherein (A) has a polydispersity index from 4 to 7; and, (B) 30% of a rubber comprising a copolymer of ethylene and at least one $C_3$-$C_{10}$ α-olefin, wherein the rubber component has 36% of ethylene, wherein the amounts of (A) and (B) referred to the total weight of (A) and (B) and the composition has a value of viscosity [η] of the fraction soluble in xylene at room temperature of 7 to 9 dl/g.

Any of the herein described compositions, wherein the polypropylene-based compatibilizer comprises: (A) a semi-crystalline matrix comprising from about 25 to 50%, by weight, of a crystalline propylene homopolymer with a solubility in xylene at room temperature of less than or equal to 4%, or a crystalline copolymer of propylene with ethylene or a $C_4$-$C_8$ alpha-olefin having an ethylene or alpha-olefin content 0.5 to 3%, and a solubility in xylene at room temperature of from less than or equal to 4%; and, (B) a rubber comprising from about 50 to 75%, by weight, of a partially amorphous copolymer of ethylene with a $C_4$-$C_8$ alpha-olefin, wherein the alpha-olefin content is from about 10 to 20%, and the copolymer is from about 10 to 40% soluble in xylene at room temperature.

Any of the herein described compositions, wherein the polypropylene-based compatibilizer comprises: (A) a semi-crystalline matrix comprising from about 50 to 95%, by weight, of a crystalline propylene homopolymer with a solubility in xylene at room temperature of between 1 to 3%; and, (B) a rubber comprising from about 5 to 50%, by weight, a partially amorphous copolymer of ethylene with propylene, wherein the ethylene content is from about 20 and less than 100%, and the copolymer has an intrinsic viscosity of the xylene soluble fraction from about 2 to 4 dl/g (in decalin). The MFR of (A) can be from about 2 to about 200 g/10 min, or from about 2 to about 200 g/10 min, or from about 2 to about 20 g/10 min, or from about 100 to about 200 g/10 min.

Any of the herein described compositions, wherein the polypropylene-based compatibilizer comprises: (A) a semi-crystalline matrix comprising: AI) from about 25 to 75%, by weight, of a crystalline propylene homopolymer with a solubility in xylene at room temperature of less than 3%, and a MFR between 2 and 20 g/10 min; and AII) from about 5 to 40%, by weight, of a crystalline propylene homopolymer with a MFR between 40 and 140 g/10 min; and, (B) a rubber comprising from about 5 to 50%, by weight, a partially amorphous copolymer of ethylene with propylene, wherein the ethylene content is from about 20 to 100%, and the copolymer has an intrinsic viscosity of the xylene soluble fraction from about 2 to 4 dl/g (in decalin).

Any of the herein described compositions, wherein the polypropylene-based compatibilizer comprises: (A) a semi-crystalline matrix comprising AI) from about 25 to 75%, by weight, of a crystalline propylene homopolymer with a solubility in xylene at room temperature of 2 to 4%, and a MFR between 60 and 160 g/10 min; AII) from about 5 to 40%, by weight, of a high density polyethylene with a MFR between 40 and 140 g/10 min; and (B) a rubber comprising from about 5 to 50%, by weight, a partially amorphous copolymer of ethylene with propylene, wherein the ethylene content is from about 20 to 100%, and the copolymer has an intrinsic viscosity of the xylene soluble fraction from about 2 to 4 dl/g (in decalin).

Any of the herein described compositions, wherein the polypropylene-based compatibilizer comprises (A) a semi-crystalline matrix comprising AI) from 25% to 75%, by weight, based upon the total weight of (A), of a propylene homopolymer having a melt flow rate MFRI of 1.2 g/10 min; and AII) from 25% to 75% by weight, based upon the total weight of (A), of a propylene homopolymer having a melt flow rate value MFRII of 73 g/10 min; wherein the ratio MFRI/MFRI is 60; and (B) a rubber comprising a copolymer of ethylene and butene, wherein the copolymer is 36% ethylene.

An article formed from any of the compositions herein described.

An article formed from any of the compositions herein described, wherein the article is a cap, a closure, a low pressure pipe, a bag, a sheet, packaging or a film.

A method of forming the article comprising the steps of mixing any of the compositions herein described in an extruder hopper, heating the compositions, and extruding the heated compositions into one or more desired shapes.

This summary is provided to introduce a selection of concepts that are further described below in the detailed description. This summary is not intended to identify key or essential features of the claimed subject matter, nor is it intended to be used as an aid in limiting the scope of the claimed subject matter.

Definitions

As used herein, "post-consumer waste" refers to a type of waste produced by the end consumer of a material stream.

The term "recycle" means processing an item into new raw materials. When post-consumer waste is processed into raw materials, as opposed to disposal as solid waste, the raw material is called "post-consumer recycled" material. In the presently disclosed compositions and methods, the term "post-consumer resins" refer to post-consumer recycled material that is a polymer resin.

The terms "virgin" and "virgin resins" refer to resins that has not yet been processed into a consumer item.

As used herein, the term "polymer" means a macromolecular compound prepared by polymerizing monomers of the same or different type. The term "polymer" includes homopolymers, copolymers (including block and random), polymers with three or more monomers, interpolymers, and so on.

As used herein, the term "homopolymer" or "HOMO" refers to a polymer consisting solely or essentially of units derived from a single kind of monomer, e.g., polyethylene homopolymer is a polymer comprised solely or essentially of units derived from ethylene, and polypropylene homopolymer is a polymer comprised solely or essentially of units derived from propylene.

As used herein, the term "copolymer" refers to a polyolefin polymer that contains two types of alpha-olefin monomer units.

As used herein, the terms "thermoplastic polyolefins" or "TPOs" are used to refer to polyolefins that become pliable or moldable above a specific temperature and solidify upon cooling. The terms "Reactor made thermoplastic polyolefins" or "reactor thermoplastic polyolefins" or "rTPO" are used interchangeably to refer to thermoplastic polyolefins that are made in a reactor system. The rTPOs used in the present disclosure contain two components: A) a semicrystalline polypropylene-based matrix and B) a rubber component that can be a biopolymer or a terpolymer, wherein the rubber component makes up 30% or more (>30%) of the rTPO.

As used herein, the term "heterophasic copolymer" or "HECO" refers to a blend of homopolymers and/or copolymers that contains two components: A) a semi-crystalline polypropylene-based matrix and B) a rubber component that can be a biopolymer or a terpolymer, wherein the rubber component makes up less than 30% (<30%) of the HECO.

In both the rTPOs and HECOs of the present disclosure, the "semi-crystalline polypropylene matrix" of Component A may be at least one homopolymer (HOMO) polypropylene or at least one random copolymer (RACO) of propylene with ethylene or other alpha-olefins as the co-monomer. Component A may also contain more than one type of semi-crystalline polymer, which is denoted with roman numerals after the "A", such as "AI" and "AII". An example of such a semi-crystalline polypropylene matrix would be two HOMO polypropylenes with different MFRS.

In both the rTPOs and HECOs of the present disclosure, the rubber of Component B may be a bipolymer (two co-monomers) or terpolymer (three co-monomers), and is dispersed within the semi-crystalline polypropylene matrix. The rubber has elastomeric properties and a partially amorphous phase.

As used herein, the term "α-olefin" or "alpha-olefin" means an olefin of the general formula $CH_2=CH-R$, wherein R is a linear or branched alkyl containing from 1 to 10 carbon atoms. The α-olefin can be selected, for example, from propylene, 1-butene, 1-pentene, 1-hexene, 1-octene, 1-dodecene, and the like.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| HDPE | High density polyethylene |
| HECO | heterophasic copolymer |
| HOMO | homopolymer |
| MFR | Melt flow rate |
| MI | Melt index |
| PCR | Post-consumer recycle |
| PE | polyethylene |
| PP | polypropylene |
| rTPO | reactor made thermoplastic polyolefin |

BRIEF DESCRIPTION OF THE DRAWINGS

These and other features, aspects, and advantages of the present disclosure will become better understood with reference to the following description and appended claims, and accompanying drawings where:

The FIGURE is a graph of a resulting plot of the die swell ratio plotted against the apparent shear rate of three different polymer compositions.

TEST METHODS

The components of the compositions disclosed herein, the compositions themselves, and the resulting molded articles were tested and analyzed using one or more of the following test methods:

The term "melt flow rate" (MFR) refers to the measure of the ability of the melt of the base resin to flow under pressure. The melt flow rate is determined by ASTM D1238L (entitled "Standard Test Method for Melt Flow Rates of Thermoplastics by Extrusion Plastometer"), which measures the melt flow rate at 230° C. and 2.16 Kg of weight, and is given in gram/10 min. The term "ASTM D1238L" as used herein refers to a standard test method for determining melt flow rates of thermoplastics carried out by an extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Aug. 1, 2013 and published in August 2013, the contents of which are incorporated herein by reference in its entirety. The "melt flow range" is a range of melt flow rates.

The density was determined in accordance with ASTM D1505 (entitled "Standard Test Method for Density of Plastics by the Density-Gradient Technique") and is given in $g/cm^3$. The term "ASTM D1505" as used herein refers to the test method published in 2018, the contents of which are incorporated herein by reference in its entirety.

Monomer content for % $C_2$ (ethylene) was determined by carrying out specific IR measurements on a pressed plaque prepared with the disclosed compositions, and relating those measurements to previously derived calibration curves of known standard concentrations, in accordance with ITM 20061 (entitled "Infrared Spectrophotometric Determination of Ethylene Content in Propylene-Ethylene Semi crystalline Copolymers").

The xylene solubles was determined in accordance with ASTM D5492 (entitled "Standard Test Method for Determination of Xylene Solubles in Propylene Plastics") and is given in percentages (%). The term "ASTM D5492" as used herein refers to the test method published in 2017, the contents of which are incorporated herein by reference in its entirety.

The intrinsic viscosity of the fraction soluble in xylene was determined using decalin or tetrahydronaphthalene at 135° C., in accordance with ISO 1628-1 (entitled "Plastics—Determination of the viscosity of polymers in dilute solution using capillary viscometers").

Polydispersity Index (PI) measures the heterogeneity of a sample based on size. The PI was determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus, one can derive the P.I. by way of the equation: $PI=10^5/Gc$, in which Gc is the crossover modulus defined as the value (expressed in Pa) at which $G'=G''$ wherein $G'$ is the storage modulus and $G''$ is the loss modulus.

Flexural modulus (or "flex modulus") and Flexural strength (or "flex strength") are given in megapascal (MPa) and measured using ASTM D790-03 (entitled "Standard Test Methods for Flexural Properties of Unreinforced and Reinforced Plastics and Electrical Insulating Materials"). The term "ASTM D790" as used herein refers to the test method published in 2003, the content of which are incorporated herein by reference in its entirety.

The notched Izod impact strength measures the impact resistance of materials and is given in ft-lb/in. The standard testing method for notched Izod impact strength is Method A of ASTM D256-06 (entitled "Standard Test Methods for Determining the Izod Pendulum Impact Resistance of Plastics"). The term "ASTM D256" as used herein refers to the test method published in 2006. Unless otherwise noted, the temperature for this test is 73° F.

Tensile Strength and Tensile Modulusare given in megapascal (MPa) and Tensile Elongation (or Strain) are given in % and measured using ASTM D638-03 (entitled "Standard Test Method for Tensile Properties of Plastics"). The term "ASTM D638" as used herein refers to the test method published in 2003, the content of which are incorporated herein by reference in its entirety.

Die swell measures how much a polymer extrudate expands after passing through a die orifice. Die swell was measured on a ROSAND RH7 capillary rheometer using one barrel and a die with L/D of 16 (16 mm length/1 mm diameter) at 190° C. The polymer underwent a 5-minute dwell time at 190° C. and the extrudate diameter was measured at a series of shear rates from 21 1/second-4500 1/second. The reported die swell ratio is a ratio between the cross section of the extrudate at a given shear rate and the cross section of the die orifice.

For the above-referenced ASTM standards, visit the ASTM website, www.astm.org, or contact ASTM Customer Service at service@astm.org.

DESCRIPTION OF EMBODIMENTS OF THE DISCLOSURE

The present disclosure provides novel compositions utilizing recycled post-consumer (PCR) polyolefin waste. In particular, the PCR polyolefin is combined with virgin material and at least one propylene-based compatibilizer that is a thermoplastic polyolefin (TPO) or a heterophasic copolymer (HECO). In some embodiments, the compatibilizer is a reactor made TPO (rTPO) or a reactor made HECO. The propylene-based compatibilizer improves the compatibility between the virgin material and the PCR polyolefin by increasing the strength of the interface between the components and improving the dispersion of the components. This modifies the molecular properties thereof, allowing for a wider range of applications for the novel compositions.

In some embodiments, the novel compositions have an increased impact resistance with little to no loss in stiffness. In other embodiments, use of the propylene-based compatibilizer increases the Notched Izod impact strength by at least a 10%, compared to compositions without the compatibilizer. In other embodiments, use of the propylene-based compatibilizer increases the Notched Izod impact strength by at least a 10%, compared to compositions without a propylene-based compatibilizer, while the flexural modulus remains unchanged. In other embodiments, use of the propylene-based compatibilizer increasing the Notched Izod impact strength by at least a 10%, compared to compositions without a propylene-based compatibilizer, while the flexural modulus decreases by less than 20%. In yet other embodiments, the use of the propylene-based compatibilizer allows the user to adjust the impact to stiffness (Notched Izod to flexural modulus) ratio.

In the interest of reducing the impact of polyolefin waste on the environment, consumer goods made from polyolefins have been recycled for reuse. However, many of the physical and mechanical properties of PCR materials are lower than that for virgin materials because the polymer chains in the PCR have been broken from the repeated heating and shearing of the polyolefin in the extruder, exposure to UV, or through stress cracking. Thus, PCR polyolefins have been combined with virgin resins to improve the physical properties.

While some improvements have been seen, there are several challenges when combining PCR and virgin polyolefins. For example, if the PCR polyolefin is not the same type of polyolefin as the virgin polyolefin, then the two components may not fully blend. Specifically, in the melt, the two different polyolefins will phase-separate, causing structural weakness in the resulting material. Even if the PCR polyolefin and virgin polyolefin are of the same type of polyolefin, the PCR polyolefin may have small amounts of one or more 'impurities' in the form of different polyolefins or other polymers that will result in phase-separation.

The presently disclosed compositions address these challenges by using a propylene-based compatibilizer, such as a TPO or a HECO, to both improve the dispersion thereof and interface between the virgin material and the PCR polyolefin. In some embodiments, the HECO or TPO compatibilizers in the present composition have at least one component that matches both the PCR polyolefin and the virgin material. In other embodiments, wherein the PCR and virgin polyolefins are not the same polyolefin, the HECO or TPO compatibilizers in the present composition has a constituent that matches the PCR polyolefin and a constituent that matches the virgin material. This results in a stable and better blended composition, and a reduction in phase separation.

Further, the propylene-based compatibilizer can shift the physical and mechanical properties of the blends. This allows for the propylene-based compatibilizer to be selected to achieve certain desired properties in the final composition, and increase the range of applications for the blend(s).

In more detail, the compositions described herein include: (1) at least one virgin polyolefin; (2) at least one PCR olefin; and (3) a propylene-based compatibilizer that can be a TPO or a HECO, including reactor made TPOs and HECOs. The compositions may be extruded or molded into articles with physical properties (durability, flexural strength, flexural modulus, and impact resistance) that are acceptable for various applications including as cap, closures, low pressure pipes, bags, sheets, fibers, packaging and films.

Virgin Polyolefin:

The compositions disclosed herein include at least one virgin polyolefin. Any virgin polyolefin can be used in the present compositions, including all types of PE, PP, and other $C_4$-$C_{10}$ alpha-olefins.

The total amount of virgin polyolefin in the present compositions is between about 5 wt. % to about 85 wt. %, based on the weight of the composition. In some embodiments, the total amount of virgin polyolefin present is about 5 and about 45 wt. %; alternatively, the total amount of virgin polyolefin present is about 30 and about 65 wt. %;

alternatively, the total amount of virgin polyolefin present is about 55 and about 85 wt. %; alternatively, the total amount of virgin polyolefin present is about 45 and about 75 wt. %.

In some embodiments, the virgin polyolefin is a homopolymer having a MFR that is greater than 2 g/10 min (230° C./2.16 kg), alternatively greater than 50 g/10 min (230° C./2.16 kg), alternatively greater than 100 g/10 min (230° C./2.16 kg), alternatively greater than 1500 g/10 min (230° C./2.16 kg). In other embodiments, the virgin polyolefin is a homopolymer having a high stiffness. In yet other embodiments, the virgin polyolefin has a flexural modulus (ASTM D 790) (1.3 mm/min, 1% secant, Procedure A) ranging from about 240 to about 300 kpsi, alternatively about 290 kpsi (2000 MPa), a Notched Izod Impact Strength (73° F., Method A) ranging from about 0.3 to about 1 ft-lb/in, alternatively about 0.3 ft-lb/in, a Tensile Strength at Yield (2 in/min) ranging from about 2800 psi to about 6200, alternatively from about 5000 psi to about 6200 psi, alternatively about 6100 psi, and an Elongation at Yield ranging from about 5% to about 9%, alternatively about 6%. In yet other embodiments, the virgin polyolefin has a xylene solubles content of between 1 to about 5% by weight. In any of these embodiments, the virgin polyolefin is a PP or PE homopolymer.

In alternative embodiments, the virgin polyolefin has: (A) from about 50 to 95%, by weight, of a crystalline propylene homopolymer with a solubility in xylene at room temperature of between 1 to 3%; and, (B) from about 5 to 50%, by weight, of a partially amorphous copolymer of ethylene with propylene, wherein the ethylene content is from about 20 and less than 100%, and the copolymer had an intrinsic viscosity of the xylene soluble fraction from about 2 to 5 dl/g (in decalin). In these alternative embodiments, the virgin polyolefin has an MFR of the crystalline propylene homopolymer from about 100 to about 300 g/10 min.

In yet other embodiments, a combination of virgin polyolefins with different MFR are used. For example, a virgin polyolefin having a low MFR can be combined with a virgin polyolefin having a higher MFR to achieve a composition with a MFR somewhere in between. In some embodiments, a virgin polyolefin with a MFR between 20 and 80 g/10 min (230° C./2.16 kg) can be combined with a virgin polyolefin with a MFR between 500 to about 2500 g/10 min (230° C./2.16 kg) to achieve a polyolefin composition with an MFR greater than at least 20 g/10 min (230° C./2.16 kg) but lower than 2500 g/10 min (230° C./2.16 kg).

PCR Olefin:

The compositions disclosed herein include at least one recycled post-consumer polyolefin. The post-consumer material is crushed and ground into small particles or flakes that can then be combined with the propylene-based compatibilizer and virgin resins in an extrusion hopper.

Any PCR polyolefin can be used in the present compositions, including all types of PE, PP, and $C_4$-$C_{10}$ alpha-olefins. In some embodiments, the PCR polyolefin can comprise a single polyolefin. In other embodiments, the PCR polyolefin can comprise a combination of polyolefins. Alternatively, the PCR polyolefin resin is a recycled high density or low density PE.

The total amount of PCR polyolefin in the present compositions is between about 5 wt. % to about 85 wt. %, based on the weight of the composition. In some embodiments, the total amount of PCR polyolefin present is about 5 and about 45 wt. %; alternatively, the total amount of PCR polyolefin present is about 30 and about 65 wt. %; alternatively, the total amount of PCR polyolefin present is about 55 and about 85 wt. %; alternatively, the total amount of PCR polyolefin present is about 15 and about 45 wt. %; alternatively, the PCR polyolefin is present in an amount of 5, 10, 15, 20, 25, 40, or 50 wt. %.

In some embodiments, the PCR polyolefin resin can have a melt index (MI) between about 0.3 to about 1, or between about 0.3 to 0.7, or between about 0.6 to 1, or between about 0.4 to 0.8. In other embodiments, the PCR polyolefin resin can have a density between about 0.940 to about 0.970 g/cm$^3$, or between about 0.940 to about 0.960 g/cm$^3$, or between about 0.950 to about 0.970 g/cm$^3$, or between about 0.945 to about 0.965 g/cm$^3$.

In some embodiments, the PCR polyolefin resin is a PE with a MI between about 0.3 to about 1, and a density between about 0.940 to about 0.970 g/cm$^3$.

Compatibilizer:

The compositions disclosed herein further include at least one propylene-based compatibilizer. This propylene-based compatibilizer can be a TPO or a HECO, including reactor made TPOs and HECOs. Both TPOs and HECOs have a semi-crystalline polypropylene matrix component and a rubber component; however, the content of the rubber component in the HECOs is less than 30% while the content of the rubber component in the TPO is 30% or more.

The total amount of HECO or TPO compatibilizer in the presently described compositions is between about 10 wt % to about 50 wt %, alternatively between about 10 wt. % to about 40 wt. %, based on the weight of the composition. In some embodiments, the total amount of compatibilizer present is about 10 and about 27 wt. %; alternatively, the total amount of compatibilizer present is about 20 and about 35 wt. %; alternatively, the total amount of compatibilizer present is about 15 and about 29 wt. %; alternatively, the compatibilizer is present in an amount between about 15 and about 20 wt. %.

Though propylene-based, HECOs or TPOs compatibilizers made with other $C_2$-$C_{10}$ constituents can be used in the presently described methods.

In some embodiments, the propylene-based compatibilizer is a TPO or a rTPO compatibilizer that includes a semi-crystalline polypropylene-based matrix, and a bipolymer or terpolymer as the rubber component, wherein the rubber component is 30 wt. % or more (>30) of the TPO or rTPO compatibilizer. In some embodiments, the TPO or rTPO compatibilizer has a propylene homopolymer or a random copolymer (RACO) with ethylene as the semi-crystalline matrix that is mixed with a biopolymer or a terpolymer. In some embodiments of the present compositions, the bipolymer or terpolymer is a combination of propylene with at least one co-monomer selected from ethylene or $C_4$-$C_{10}$ alpha-olefins or both. In some embodiments, the TPO or rTPO includes a bipolymer as the rubber component, wherein the biopolymer is a combination of ethylene and a $C_4$-$C_{10}$ alpha-olefin co-monomer such as butene. Alternatively, the TPO or rTPO includes a terpolymer as the rubber component, wherein the terpolymer is a combination of propylene with an ethylene co-monomer and a $C_4$-$C_{10}$ alpha-olefin co-monomer such as butene.

In yet other embodiments, the compatibilizer is a rTPO having a PE and a PP constituent. Alternatively, the compatibilizer is a rTPO having a PP constituent and a $C_4$-$C_{10}$ alpha-olefin constituent.

In other embodiments, the compatibilizer is a HECO compatibilizer, including reactor made HECOs, that includes a semi-crystalline polypropylene-based matrix, and a bipolymer or terpolymer as the rubber component, wherein the rubber component is less than 30 wt. % of the HECO compatibilizer. In some embodiments, the HECO compatibilizer has a propylene homopolymer or a random copolymer (RACO) with ethylene as the semi-crystalline matrix that is mixed with a biopolymer or a terpolymer. In some embodiments of the present compositions, the bipolymer or terpolymer is a combination of propylene with at least one co-monomer selected from ethylene or $C_4$-$C_{10}$ alpha-olefins or both. In some embodiments, the HECO includes a bipolymer as the rubber component, wherein the biopolymer is a combination of ethylene and a $C_4$-$C_{10}$ alpha-olefin co-monomer such as butene. Alternatively, the HECO includes a terpolymer as the rubber component, wherein the terpolymer is a combination of propylene with an ethylene co-monomer and a $C_4$-$C_{10}$ alpha-olefin co-monomer such as butene.

The amount of propylene co-monomer in the rubber component of the HECO or TPO compatibilizer can vary from about 0 to less than 100 wt. % of the rubber component. In some embodiments, the amount of propylene co-monomer in the rubber component is between about 0 to about 45 wt. %; alternatively, the amount of propylene co-monomer in the rubber component is between about 30 to about 65 wt. %; alternatively, the amount of propylene co-monomer in the rubber component is between about 50 to about 80 wt. %; alternatively, the amount of propylene co-monomer in the rubber component is between about 75 to less than 100 wt. %.

The amount of rubber component in the HECO compatibilizer can vary from about 5 wt. % to up to 30 wt. % of the HECO. In some embodiments, the amount of rubber is between about 5 to about 20 wt. % of the HECO compatibilizer; alternatively, the amount of rubber is between about 15 up to, but less than, 30 wt. % of the HECO compatibilizer; alternatively, the amount of rubber is between about 10 to less than 30 wt. % of the HECO compatibilizer.

The amount of rubber component in the rTPO compatibilizer can vary from 30 wt. % to up to about 80 wt. % of the rTPO. In some embodiments, the amount of rubber is between 30 to about 55 wt. % of the rTPO compatibilizer; alternatively, the amount of rubber is between about 50 to about 80 wt. % of the rTPO compatibilizer; alternatively, the amount of rubber is between 30 to about 45 wt. % of the rTPO compatibilizer; alternatively, the amount of rubber is between 50 to about 75 wt. % of the rTPO compatibilizer.

In one aspect, the compatibilizer can be a propylene-based rTPO having a MFR between 0.35 and 1 g/10 min, and an intrinsic viscosity of the xylene soluble fraction from about 4 dL/g to 6 dL/g (in decalin). This propylene-based rTPO compatibilizer can have: (A) about 30% to less than 70% of a semi-crystalline polypropylene component selected from the group consisting of a propylene homopolymer, a random copolymer of propylene containing up to 8% of ethylene, a random copolymer of propylene containing up to 8% of at least one $C_4$-$C_{10}$ alpha-olefin, or any combination thereof, wherein the semicrystalline polypropylene component has a monomodal molecular weight distribution; and, (B) greater than 30% to about 70% of a bipolymer component of propylene and at least one co-monomer selected from ethylene and/or $C_4$-$C_{10}$ alpha-olefins, wherein the bipolymer itself has from about 50%-75% of propylene, wherein the bipolymer is partially soluble in xylene at room temperature and has an intrinsic viscosity of from about 4 to 7.5 dl/g (in decalin).

In another aspect, the compatibilizer can comprise a propylene-based rTPO having: (A) from about 25 to 50%, by weight, of a crystalline propylene homopolymer with a solubility in xylene at room temperature of less than or equal to 4%, or a crystalline copolymer of propylene with ethylene or a $C_4$-$C_8$ alpha-olefin having an ethylene or alpha-olefin content 0.5 to 3%, and a solubility in xylene at room temperature of from 2 to 10%; and, (B) from about 50 to 75%, by weight, of a partially amorphous copolymer of ethylene with a $C_4$-$C_8$ alpha-olefin as a bipolymer rubber component, wherein the alpha-olefin content is from about 10 to 20%, and the copolymer is from about 10 to 40% soluble in xylene at room temperature.

In one aspect, the polypropylene-based compatibilizer can have: (A) from about 50 to 95%, by weight, of a crystalline propylene homopolymer with a solubility in xylene at room temperature of between 1 to 3%; and optionally a MFR of about 20 to about 200 g/10 min, alternatively a MFR of about 20 to about 100 g/10 min, alternatively a MFR of about 100 to about 200 g/10 min, and (B) from about 5 to 50%, by weight, of a partially amorphous copolymer of ethylene with propylene as a bipolymer rubber component, wherein the ethylene content is from about 20 and less than 100%, and the copolymer has an intrinsic viscosity of the xylene soluble fraction from about 2 to 5 dl/g (in decalin).

In one aspect, the polypropylene-based compatibilizer can have: (A) from about 50 to 95%, by weight, of a crystalline propylene homopolymer with a solubility in xylene at room temperature of between 1 to 3% and optionally a MFR of about 2 to about 200 g/10 min; and, (B) from about 5 to 50%, by weight, of a partially amorphous copolymer of ethylene with propylene as a bipolymer rubber component, wherein the ethylene content is from about 20 and less than 100%, and the copolymer has an intrinsic viscosity of the xylene soluble fraction from about 2 to 5 dl/g (in decalin).

In one aspect, the polypropylene-based compatibilizer can have: (A) from about 50 to 95%, by weight, of a crystalline propylene homopolymer with a solubility in xylene at room temperature of between 1 to 3% and a MFR of about 2 to about 20 g/10 min; and, (B) from about 5 to 50%, by weight, of a partially amorphous copolymer of ethylene with propylene as a bipolymer rubber component, wherein the ethylene content is from about 20 and less than 100%, and the copolymer has an intrinsic viscosity of the xylene soluble fraction from about 2 to 5 dl/g (in decalin).

In yet another aspect, the polypropylene-based compatibilizer is an TPO that has components (A) and (B), wherein the amounts of (A) and (B) referred to the total weight of (A) and (B) and the composition has a value of viscosity [η] of the fraction soluble in xylene at room temperature of 7 to 9 dl/g (in tetrahydronaphthalene). Components (A) and (B) are as follows:

(A) 70% of a polypropylene component comprising (AI) from 25% to 75% by weight, based upon the total weight of (A), of a propylene polymer having a melt flow rate MFRI of 1.2 g/10 min; and (AII) from 25% to 75% by weight, based upon the total weight of (A), of a propylene polymer having a melt flow rate value MFRII of 73 g/10 min; wherein the ratio MFRII/MFRI is 60 and the propylene polymers (AI) and (AII) are independently selected from the group consisting of a propylene homopolymer, a random copolymer of propylene containing up to 3% of ethylene, and a random copolymer of propylene containing up to 6% of at least one $C_4$-$C_{10}$ α-olefin and optionally up to 3% of ethylene; the amounts of (AI) and (AII) being referred to the total weight of (AI) and (AII) wherein (A) has a polydispersity index from 4 to 7;

(B) a rubber component that is 30% of a copolymer of ethylene and at least one $C_3$-$C_{10}$ α-olefin, wherein the copolymer or terpolymer is about 36% of ethylene.

In one aspect, the propylene-based compatibilizer can have: (AI) from about 25 to 75%, by weight, of a semicrystalline propylene homopolymer with a solubility in xylene at room temperature of 2 to 4%, and a MFR between 60 and 160 g/10 min; (AII) from about 5 to 40%, by weight, of a high density polyethylene with a MFR between 40 and 140 g/10 min; and (B) from about 5 to 50%, by weight, of a partially amorphous copolymer of ethylene with propylene as a bipolymer rubber component, wherein the ethylene content is from about 20 to 100%, and the copolymer has an intrinsic viscosity of the xylene soluble fraction from about 2 to 4 dl/g (in decalin).

In one aspect, the propylene-based compatibilizer can have component A comprising (AI) from about 25 to 75%, by weight, of a crystalline propylene homopolymer with a solubility in xylene at room temperature of less than 3%, and a MFR between 2 and 20 g/10 min; (AII) from about 5 to 40%, by weight, of a crystalline propylene homopolymer with a MFR between 40 and 140 g/10 min; and component (B) from about 5 to 50%, by weight, of a partially amorphous copolymer of ethylene with propylene as a bipolymer rubber component, wherein the ethylene content is from about 20 to 100%, and the copolymer has an intrinsic viscosity of the xylene soluble fraction from about 2 to 4 dl/g (in decalin).

In another aspect, the propylene-based compatibilizer has a MFR between 0.35 and 35 g/10 min, wherein the propylene-based compatibilizer has: a component (A) comprising 10-60 parts by weight of a homopolymer of propylene with isotactic index greater than 80, or a copolymer having over 85% by weight of propylene with (i) ethylene or (ii) $CH_2=CHR$ alpha-olefins, where R is a 2-8 carbon alkyl radical, or combinations of (i) and (ii); a component (BI) comprising 5-20 parts by weight of a copolymer fraction containing ethylene that is insoluble in xylene at ambient temperature; and a component (BII) having 37-80 parts by weight of a copolymer fraction of ethylene and (i) propylene or (ii) another $CH_2=CHR$ α-olefin, or combinations of (i) and (ii), and, optionally, minor portions of a diene, wherein component (BII) is less than 40% by weight of ethylene, being soluble in xylene at ambient temperature, and having an intrinsic viscosity from about 1.5 to 5 dl/g, wherein the percent by weight of the sum of the (BI) and (BII) components with respect to the total polyolefin composition is from about 40% to 90% and the (BI)/(BII) weight ratio is lower than 0.4. Components (BI) and (BII) make up the rubber component of this compatibilizer.

In some embodiments, the propylene-based compatibilizer is a reactor made heterophasic thermoplastic olefin copolymer, wherein a propylene homopolymer or a random copolymer (RACO) with ethylene is mixed with a bipolymer. In other embodiments, the compatibilizer is a reactor made heterophasic thermoplastic olefin terpolymer that contains three components: AI) a semi-crystalline propylene homopolymer, or random copolymer with ethylene or other alpha-olefins; AII) a polyethylene homopolymer, polypropylene homopolymer, or a polyethylene copolymer with 1-butene or other alpha-olefins; and, B) an elastomeric rubber component consisting of a copolymer of propylene and ethylene.

In any of the above compatibilizers, the alpha-olefin may be selected from a group comprising 1-butene, 1-pentene, 1-hexene, 4-methyl-1-pentene and 1-octene.

All of the propylene-based compatibilizer described above are exemplary and show the wide variation in the formulations that allows for the broad use of TPOs and HECOs resins, including reactor-made TPO and HECO resins, as compatibilizers. In addition to the formulas above, the propylene-based compatibilizers for the current compositions can also include any of the formulas described in U.S. Pat. No. 5,286,564, each of which is incorporated herein in its entirety for all purposes. The propylene-based compatibilizers can also be prepared by any of the reactor processes described in US2009015678, U.S. Pat. Nos. 7,592,393, 8,008,400, EP1025169, EP0640648, EP0472946, EP1687372, WO2016207235, WO2016207236, and US2012184675A as well.

In yet more embodiments, the propylene-based compatibilizer is an rTPO or HECO prepared using a multi-stage gas phase polymerization process that creates an alloy of a rubber components (biopolymer or terpolymer) with the polymer matrix (e.g. semi-crystalline PP backbone) while in the reactors. This allows for the rubber component to be evenly dispersed throughout the polymer matrix because both are produced simultaneously during the polymerization process.

Examples of commercially available compatibilizers used in the present compositions include, but are not limited to, Pro-fax, Adflex and Hifax series of rTPOs and HECOs from LyondellBasell (Houston, Tex.).

Optional Additives:

In addition to the virgin resin, the PCR resin, and the compatibilizer, the compositions can include optional additives to impart color, including a dye, pigment, or other substance that imparts color to the polymeric composition and subsequent articles, and includes substances that impart metallic or pearlescent effects.

Further, the compositions can include antioxidants, nucleators, slip agents, UV light stabilizers, anti-scratch agents or other additives as needed for the end-use of the compositions and/or articles.

Articles:

The present disclosure further includes embodiments for articles and methods of forming the articles.

Some embodiments of the present disclosure are directed to an article prepared using any of the above described compositions. Alternatively, the embodiments are directed to an article prepared using any of the above compositions, wherein the article is in the form of sheets, films, pipes, strands, tubes, containers, pellets, or custom profiles specific to certain applications.

Some embodiments of the present disclosure are methods of producing an article from any of the above-described compositions, the method involving dry-blending the virgin resin(s), the compatibilizer(s), and the PCR resin; melting the composition at a known temperature; and extruding the composition through a die. In some methods, the method of dry-blending and melting occur in an extruder hopper.

In some embodiments, methods of producing compression molded caps or closures are provided herein. Applicants presently believe that compositions described herein may be compression molded into caps or closures. The compositions described herein may have sufficient die swell for producing the caps or closures. In an embodiment, the compositions described herein have a die swell such that the compositions do not swell into a "mushroom top" after being sliced from an extrudate and before being transferred into the compression mold.

Physical Properties:

The above-described compositions and articles formed therefrom can have the following physical properties:

MFR

In some embodiments, the polyolefin composition has a MFR (ASTM D1238L) (230° C./2.16 kg) from about 4 to about 35 g/10 min; alternatively from about 15 to about 35 g/10 min; alternatively, from about 15 to about 30 g/10 min;

alternatively, from about 25 to about 35 g/10 min; alternatively, from about 20 to about 30 g/10 min.

Flexural Modulus

In some embodiments, the polyolefin composition has a flexural modulus (ASTM D790) (1.3 mm/min, 1% secant, Procedure A) from about 155 to about 300 kPSI, alternatively from about 160 to about 300 kPSI, alternatively from 160 to about 170 kPSI, alternatively from about 170 to about 300 kPSI, alternatively from about 170 to about 270, alternatively from about 200 to about 270 kPSI (1378-1860 MPa); alternatively, from about 200 to about 250 kPSI; alternatively, from about 240 to about 270 kPSI; alternatively, from about 215 to about 240 kPSI.

Tensile Strength at Yield

In some embodiments, the polyolefin composition has a tensile yield strength (ASTM D638) of at least 3700 psi, alternatively at least 4000 psi (~27 MPa); alternatively, from about 4000 to about 5000 PSI; alternatively, from about 4000 to about 4400 PSI; alternatively, from about 4300 to about 4800 PSI.

Elongation at Yield

In some embodiments, the polyolefin composition has an Elongation at Yield from about 3 to about 10%; alternatively, from about 3 to 7%; alternatively, from about 6 to 10%; alternatively, from about 4 to about 9.5%; alternatively, from about 7 to about 7.5%.

Tensile Strength at Break

In some embodiments, the polyolefin composition has a tensile break strength (ASTM D638) of at least about 190 psi, alternatively at least 2000 psi (~14 MPa); alternatively, from about 2000 to about 5000 PSI; alternatively, from about 2000 to about 3200 PSI; alternatively, from about 3000 to about 4800 PSI.

Elongation at Break

In some embodiments, the polyolefin composition has an Elongation at Break from about 3 to above 200%, alternatively, from about 3 to about 60%; alternatively, from about 3 to 45%; alternatively, from about 35 to 60%; alternatively, from about 3 to about 10%; alternatively, from about 30 to about 50%.

Notched Izod impact strength at 73° F.

In some embodiments, the polyolefin composition has a notched Izod Impact at 73° C. (ASTM D256) from about 0.4 to no break, alternatively from about 0.4 to about 12 ft-lb/in, alternatively from about 1.5 to 4 ft-lb/in, alternatively from about 0.4 to about 1.5 ft-lb/in; alternatively, from about 0.4 to 0.8 ft-lb/in; alternatively, from about 0.7 to 1.1 ft-lb/in; alternatively, from about 0.9 to 1.5 ft-lb/in; and alternatively, from about 0.7 to 1.2 ft-lb/in.

EXAMPLE

The following examples are included to demonstrate embodiments of the appended claims using the above-described compositions. These examples are intended to be illustrative only, and not to unduly limit the scope of the appended claims. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

This example demonstrates the shift in physical properties resulting from the addition of a HECO or TPO compatibilizer to a PCR/virgin resin mixture. The formulations for the compositions and its comparative (no compatibilizer) composition are shown in Table 1, and the weight percentages were calculated using the total weight of each composition.

The components for these compositions are as follows.

Base virgin resin: Four different virgin polypropylene resins from LyondellBasell (Houston, Tex.) were used in the examples. Each example had at least one of the virgin resin, however most examples utilized a combination thereof.

Virgin Resin A (VRA) was an extremely high melt flow rate PP homopolymer resin with a very narrow molecular weight distribution. The melt flow rate of VRA was 1800 g/10 min (230° C./2.16 kg). The ultra-high melt flow rate allows reduced processing temperatures and energy savings. This resin was added to some of the present compositions to further increase the MFR of the blend to a target MFR of about 20.

Virgin Resin B (VRB) was a high melt flow rate, nucleated polypropylene homopolymer. The melt flow rate of VRB was 65 g/10 min (230° C./2.16 kg). VRB had a flexural modulus (ASTM D 790) (1.3 mm/min, 1% secant, Procedure A) of about 290 kpsi (2000 MPa), a Notched Izod Impact Strength (73° F., Method A) of 0.3 ft-lb/in, a Tensile Strength at Yield (2 in/min) of 6100 psi, and an Elongation at Yield of 6%. As such, VRB has been used as a building block for applications that require high flow and high stiffness.

Virgin Resin C (VRC) was a low melt flow rate polypropylene homopolymer. The melt flow rate of VRC was 2.3 g/10 min (230° C./2.16 kg). VRC had a flexural modulus (ASTM D790) (1.3 mm/min, 1% Secant, Procedure A) of about 275 kpsi (1900 MPa), a Notched Izod Impact Strength (73° F., Method A) of 1.0 ft-lb/in, and a Tensile Strength at Yield (2 in/min) of 5400 psi. This resin was added to some of the present compositions to moderately increase the MFR of the blend to a target MFR of about 4 to about 12.

Virgin Resin D (VRD) was a polyolefin having: (A) about 87%, by weight, of a crystalline propylene homopolymer with a solubility in xylene at room temperature of about 2%; and, (B) about 13%, by weight, of a partially amorphous copolymer of ethylene with propylene, wherein the ethylene content was about 57%, and the copolymer had an intrinsic viscosity of the xylene soluble fraction was about 2.4 dl/g (in decalin). VRD had an MFR of the crystalline propylene homopolymer of about 185 g/10 min.

PCR Resin: The PCR resin used in the examples was a high density polyethylene (HDPE) that came from recycled milk jugs. The HDPE milk jugs were washed, ground, and then pelletized.

Compatibilizers: Eight different compatibilizers from LyondellBasell (Houston, Tex.) were used in the examples. These compatibilizers were reactor made HECOs or TPOs that contained polymer chains composed of sections of PP, PE, and butene.

Compatibilizer A (CA) was a compatibilizer that had: (A) about 77%, by weight, of a crystalline propylene homopolymer with a solubility in xylene at room temperature of about 2%; and, (B) about 23%, by weight, of a partially amorphous copolymer of ethylene with propylene, wherein the ethylene content was about 44%, and the copolymer had an intrinsic viscosity of the xylene soluble fraction of about 4 dl/g (in decalin). For Compatibilizer A, the MFR of the crystalline propylene homopolymer was about 12 g/10 min.

Compatibilizer B (CB) was a compatibilizer that had: (A) about 79%, by weight, of a crystalline propylene homopolymer with a solubility in xylene at room temperature of 2.3%; and, (B) about 21%, by weight, of a partially amorphous copolymer of ethylene with propylene, wherein the ethylene content was about 44%, and the copolymer had an intrinsic viscosity of the xylene soluble fraction of about 4 dl/g (in decalin). For Compatibilizer B, the MFR of the crystalline propylene homopolymer was about 150 g/10 min.

Compatibilizer C (CC) was a compatibilizer that comprised 70% of (A) and 30% of (B) wherein: (A) a polypropylene component comprising (AI) 50% by weight, based upon the total weight of (A), of a propylene homopolymer had a melt flow rate MFRI below 5 g/10 min; and (AII) 50% by weight, based upon the total weight of (A), of a propylene homopolymer having a melt flow rate value MFRII above 50 g/10 min; wherein the ratio MFRII/MFRI was 60; and (B) a copolymer of ethylene and propylene, wherein the copolymer was 36% ethylene. Compatibilizer C had a value of viscosity [ii] of the fraction soluble in xylene at room temperature of about 8.2 dl/g (tetrahydronaphthalene).

Compatibilizer D (CD) was a rTPO that comprised: (AI) about 54%, by weight, of a crystalline propylene homopolymer with a solubility in xylene at room temperature of 2 to 4%, and a MFR between 60 and 160 g/10 min; (AII) about 11%, by weight, of a high density polyethylene; and (B) about 35%, by weight, of a partially amorphous copolymer of ethylene with propylene, wherein the ethylene content was about 48%, and the copolymer had an intrinsic viscosity of the xylene soluble fraction of about 3.2 dl/g (in decalin). The MFR of the combination of AI and AII of CD was about 90 g/10 min.

Compatibilizer E (CE) was a rTPO that comprised: (AI) about 32.5%, by weight, of a crystalline propylene homopolymer with a solubility in xylene at room temperature of less than 3%, and a MFR of between about 2 and about 20 g/10 min; (AII) about 31%, by weight, of a crystalline propylene homopolymer with a MFR between about 600 and 1000 g/10 min; and (B) about 36.5%, by weight, of a partially amorphous copolymer of ethylene with propylene, wherein the ethylene content was about 52%, and the copolymer had an intrinsic viscosity of the xylene soluble fraction of about 2.8 dl/g (in decalin). The MFR of the combination of AI and AII of CE was about 85 g/10 min.

Compatibilizer F (CF) was a rTPO that comprised: (A) about 30%, by weight, of a crystalline propylene homopolymer with a solubility in xylene at room temperature of less than or equal to 4%; and, (B) about 70%, by weight, of a partially amorphous copolymer of ethylene with butene, wherein butene content was about 16%, and the copolymer was about 20% soluble in xylene at room temperature.

Compatibilizer G (CG) was a rTPO with a MFR of about 0.8 g/10 min, and an intrinsic viscosity of the xylene soluble fraction of about 5 dL/g (in decalin). Compatibilizer G had: (A) about 50% of a semi-crystalline propylene homopolymer; and, (B) about 50% of a bipolymer component of propylene and ethylene, wherein the bipolymer itself had from about 50% to about 75% of propylene.

Compatibilizer H (CH) had: (A) about 74%, by weight, of a crystalline propylene homopolymer with a solubility in xylene at room temperature of about 2%; and, (B) about 26%, by weight, of a partially amorphous copolymer of ethylene with propylene, wherein the ethylene content was about 51%, and the copolymer had an intrinsic viscosity of the xylene soluble fraction of about 3 dl/g (in decalin). For Compatibilizer H, the MFR of the crystalline propylene homopolymer was 56 g/10 min.

TABLE 1

Compositions for resins containing PCR material

| | Comparative | | | | Examples | | | | | | | | | |
|---|---|---|---|---|---|---|---|---|---|---|---|---|---|---|
| | 1 | 2 | 3 | 4 | 1 | 2 | 3 | 4 | 5 | 6 | 7 | 8 | 9 | 10 |
| VRA (wt. %) | 0 | | 4.7 | 16.3 | 17.7 | 20 | | 33.8 | | 7.4 | 31.4 | 14.9 | | |
| VRB (wt. %) | 75 | 65 | 59.6 | 43.7 | 31.1 | 20.9 | 58.9 | | 45.8 | 54.5 | | 10 | 34.9 | 23.8 |
| VRC (wt. %) | | 30 | 20.7 | | | 27.9 | | | 3 | | | | 8.9 | |
| PCR (wt. %) | 25 | 5 | 15 | 40 | 25 | 5 | 15 | 40 | 25 | 25 | 25 | 25 | 30 | 50 |
| CA (wt. %) | | | | | 26.1 | 26.1 | 26.1 | 26.1 | 26.1 | 13 | 43.5 | 50 | 26.1 | 26.1 |
| CB (wt. %) | | | | | | | | | | | | | | |
| CC (wt. %) | | | | | | | | | | | | | | |
| CD (wt. %) | | | | | | | | | | | | | | |
| CE (wt. %) | | | | | | | | | | | | | | |
| CF (wt. %) | | | | | | | | | | | | | | |
| CG (wt. %) | | | | | | | | | | | | | | |
| Total Rubber Content (wt. %) | 0 | 0 | 0 | 0 | 6 | 6 | 6 | 6 | 6 | 3 | 10 | 11.5 | 6 | 6 |

| | Examples | | | | | | | | | | | | |
|---|---|---|---|---|---|---|---|---|---|---|---|---|---|
| | 11 | 12 | 13 | 14 | 15 | 16 | 17 | 18 | 19 | 20 | 21 | 22 | 23 |
| VRA (wt. %) | 0 | | | 22.7 | 2 | 10 | 3.4 | 3.1 | 2.4 | 0 | 13.1 | | 10 |
| VRB (wt. %) | 46.3 | 26.1 | 21.4 | 32.3 | 73 | 55 | 54.5 | 55.5 | 64 | 58 | 49.7 | | |
| VRC (wt. %) | | 20.1 | | | | | | | | | | | |
| VRD (wt. %) | | | | | | | | | | | | 30 | 20 |
| PCR (wt. %) | 25 | 25 | 50 | 25 | 5 | 15 | 25 | 25 | 25 | 25 | 25 | 30 | 30 |
| CA (wt. %) | | | | | | | | | | | | | |
| CB (wt. %) | 28.6 | 28.7 | 28.5 | | | | | | | | | | |
| CC (wt. %) | | | | 20 | 20 | 20 | | | | | | | |
| CD (wt. %) | | | | | | | 17.1 | | | | | | |
| CE (wt. %) | | | | | | | | 16.4 | | | | | |
| CF (wt. %) | | | | | | | | | 8.6 | 17 | | | |
| CG (wt. %) | | | | | | | | | | | 12.2 | | |
| CH (wt. %) | | | | | | | | | | | | 40 | 40 |
| Total Rubber Content (wt. %) | 6 | 6 | 6 | 6 | 6 | 6 | 6 | 6 | 6 | 12.6 | 6 | 14 | 13 |

Physical Properties: Each of the blends in Table 1 was evaluated according to the methods disclosed above under "Test methods". The results for Compositions comparative 1-4 and Examples 1-23 are shown below in Table 2.

The flexural modulus of a material is a physical property denoting the ability for that material to bend. The flexural modulus measurement is shown in Table 2. Many Examples had a smaller flexural modulus compared to the Compara-

TABLE 2

Physical Properties

| | Comparative | | | | Examples | | | | | | | | | |
|---|---|---|---|---|---|---|---|---|---|---|---|---|---|---|
| | 1 | 2 | 3 | 4 | 1 | 2 | 3 | 4 | 5 | 6 | 7 | 8 | 9 | 10 |
| MFR (g/10 min) | 36 | 20 | 22 | 31 | 23 | 13 | 24 | 29 | 12 | 27 | 24 | 9.0 | 7.7 | 3.9 |
| Flex Mod. 1% Secant Modulus (kPSI) | 256 | 306 | 285 | 234 | 207 | 252 | 242 | 187 | 217 | 236 | 180 | 171 | 214 | 179 |
| Notched Izod (ft-lb/in) | 0.36 | 0.42 | 0.38 | 0.35 | 1.06 | 0.96 | 0.87 | 0.86 | 1.09 | 0.67 | 1.47 | 2.42 | 1.25 | 11.85 |
| Elongation at Break (%) | 4.7 | 16 | 12 | 4.4 | 11 | 76 | 25 | 6.1 | 21 | 7.6 | 12 | 37 | 120 | 200 |
| Elongation at Yield (%) | 4.7 | 6 | 6.4 | | 6 | 5.8 | 5.3 | 5.7 | 6.7 | 5.9 | 5.7 | 7.4 | 8 | 9.3 |
| Tensile at Break (psi) | 5110 | 4430 | 5090 | 4810 | 3920 | 1980 | 3760 | 4050 | 3430 | 4710 | 3260 | 2430 | 190 | 192 |
| Tensile at Yield (psi) | 5120 | 5700 | 5640 | | 4310 | 4810 | 4720 | 4090 | 4520 | 4840 | 3780 | 3750 | 4540 | 4190 |

| | Examples | | | | | | | | | | | | |
|---|---|---|---|---|---|---|---|---|---|---|---|---|---|
| | 11 | 12 | 13 | 14 | 15 | 16 | 17 | 18 | 19 | 20 | 21 | 22 | 23 |
| MFR (g/10 min) | 29 | 9.2 | 9.5 | 18 | 24 | 19 | 27 | 30 | 31 | 22 | 26 | 17 | 27 |
| Flex Mod. 1% Secant Modulus (kPSI) | 213 | 226 | 177 | 213 | 250 | 228 | 220 | 227 | 237 | 217 | 204 | 164 | 168 |
| Notched Izod (ft-lb/in) | 0.88 | 1.12 | 3.41 | 1.09 | 0.89 | 1.07 | 0.79 | 0.69 | 0.38 | 0.44 | 0.96 | NB | 3 |
| Elongation at Break (%) | 7 | 20 | 18 | 36 | 57 | 44 | 6.1 | 5 | 6.1 | 9.9 | 14 | 8.7 | 5.7 |
| Elongation at Yield (%) | 5.2 | 7.4 | 8.7 | 7.3 | 5.8 | 6.4 | 5.2 | 4.8 | 6.1 | 7.4 | 6.3 | 6.4 | 5.2 |
| Tensile at Break (psi) | 3980 | 3080 | 3580 | 2300 | 3160 | 2340 | 4150 | 4300 | 4850 | 4400 | 3890 | 3140 | 3370 |
| Tensile at Yield (psi) | 4250 | 4560 | 4140 | 4560 | 4890 | 4680 | 4310 | 4350 | 4860 | 4510 | 4360 | 3470 | 3480 |

As can be seen in Table 2, the addition of a compatibilizer changed the physical properties as compared to Comparative Compositions 1-4.

The notched Izod test measures a material's resistance to impact from a swinging pendulum. Many Examples had a larger notched Izod value compared to the Comparative Compositions 1-4, indicating that the exemplary compositions are more impact resistant. The compatibilizer increased the Notched Izod impact strength by at least a 10% (Example 6) compared to Comparative Composition 1; however, most of the examples increased the Notched Izod impact strength by 90%.

tive Compositions 1-4, indicating that the exemplary compositions are more flexible. The reduction in flexural modulus was less than about 20%.

The tensile at yield and at break for each of the examples was also lower than that of Comparative Compositions 1-4. However, the percent elongation was either the same or larger. This indicates that the presently disclosed compositions are more likely to break when stretched. Further, the large range in elongation shows that it is possible to modify the physical properties using the compatibilizer for different applications.

Thus, the examples show that the compatibilizer can significantly increase the Notched Izod impact strength by over 90% while maintaining the flexural modulus or only lowering it by about 10% or less.

The examples show that blending virgin PP with PE PCR in the range of 5% to 40% (without compatibilizer as provided in the comparative examples) results in flexural modulus/notched Izod values that range from 668 to 770 kpsi/ft-lb/in. The example show that using the compatibilizers (any of CA, CB, CC, CD, CE, CF, CG, CH, or CI) with PP and PE PCR in the range of 5% to 40% results in flexural modulus/notched Izod values ranging from about 10 to about 650 kpsi/ft-lb/in, alternatively from about 15 to about 622 kpsi/ft-lb/in, alternatively from about 150 to about 300 kpsi/ft-lb/in, alternatively from about 175 to about 280 kpsi/ft-lb/in.

These results from each of the samples demonstrate that multiple HECO and TPO compatibilizers, including those made using a reactor system, can shift the properties of compositions comprising recycled post-consumer polyolefin waste. Though these examples utilized virgin PP and PCR PE resins, similar results will be seen with other $C_2$-$C_{10}$ polyolefins.

The exemplary compositions displayed a large range of physical properties, allowing for a broad number of applications. For example, compositions 1, 2, 5, 9 and 12 may be the appropriate for cap and closure applications based on these properties shown in Table 2. However, the remaining compositions are still useful for other applications such as a low-pressure pipe, a bag, a sheet, crates, containers, packaging or a film.

The die swell of Example No. 1 was measured on a capillary rheometer as described in "Test Methods". The die swell ratio of Example No. 1 was plotted against the apparent Shear rate, 1/second. The resulting plot is presented in the following graph of FIG. 1. Also included in the graph of FIG. 1 is the die swell ratio of an HDPE having a MFR of 21 g/10 min, and the die swell ratio of a composition blend of HDPE and 25% HDPE PCR having a MFR of 16 g/10 min, each independently plotted against the app. Shear rate, 1/s. Applicants presently believe that blended compositions of compatibilized PP and HDPE PCR have lesser or improved die swell ratios, relative to virgin HDPE of about the same MFR, and sufficient for use in compression molded processes to produce caps and closures.

In various embodiments, a compression molded cap or closure is provided, wherein the composition of the cap or closure has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein, the second melt flow rate and the second die swell ratio at a given shear rate are values of the same HDPE.

The following references are incorporated by reference in their entirety.

ASTM D1238L, Standard Test Method for Melt Flow Rates of Thermoplastics by Extrusion Plastometer.
ASTM D790-03, Standard Test Methods for Flexural Properties of Unreinforced and Reinforced Plastics and Electrical Insulating Materials.
ASTM D638-03, Standard Test Method for Tensile Properties of Plastics.
ASTM D256-06, Standard Test Methods for Determining the Izod Pendulum Impact Resistance of Plastics.
ASTM D1505-18, Standard Test Method for Density of Plastics by the Density-Gradient Technique, ASTM International, West Conshohocken, Pa., 2018.
ASTM D5492-17, Standard Test Method for Determination of Xylene Solubles in Propylene Plastics, ASTM International, West Conshohocken, Pa., 2017.
ITM 20061, Infrared Spectrophotometric Determination of Ethylene Content in Propylene-Ethylene Semi crystalline Copolymers.
ISO 1628-1, Plastics—Determination of the viscosity of polymers in dilute solution using capillary viscometers
U.S. Pat. No. 7,592,393
U.S. Pat. No. 8,008,400
EP1025169
EP0640648
EP0472946
WO2016207235
WO2016207236
US2009015678
US2012184675A

What is claimed is:

1. A composition comprising:
    (i) a virgin resin having a first polyolefin;
    (ii) a post-consumer recycled resin having a second polyolefin;
    (iii) a polypropylene-based compatibilizer, wherein the polypropylene-based compatibilizer comprises:
        (A) 70% of a semi-crystalline matrix comprising (AI) from 25% to 75% by weight, based upon the total weight of (A), of a propylene polymer having a melt flow rate MFRI of 1.2 g/10 min; and (AII) from 25% to 75% by weight, based upon the total weight of (A), of a propylene polymer having a melt flow rate value MFRII of 73 g/10 min; wherein the ratio MFRII/MFRI is 60 and the propylene polymers (AI) and (AII) are independently selected from the group consisting of a propylene homopolymer, a random copolymer of propylene containing up to 3% of ethylene, and a random copolymer of propylene containing up to 6% of at least one C4-C10 alpha-olefin and optionally up to 3% of ethylene; the amounts of (AI) and (AII) being referred to the total weight of (AI) and (AII) wherein (A) has a polydispersity index from 4 to 7; and,
        (B) 30% of a rubber comprising a copolymer of ethylene and at least one $C_3$-$C_{10}$ α-olefin, wherein the rubber component has 36% of ethylene,
    wherein the amounts of (A) and (B) referred to the total weight of (A) and (B) and the composition has a value of viscosity [η] of the fraction soluble in xylene at room temperature of 7 to 9 dl/g.

2. The composition of claim 1, wherein a flexural modulus of the composition is between about 155 to about 300 kPSI, wherein a notched Izod Impact at 73° F. of the composition is between about 0.4 to about 12 ft-lb/in, and wherein flexural modulus/notched Izod Impact values range from about 10 to about 650 kpsi/ft-lb/in.

3. The composition of claim 1, wherein the MFR of (i) is from about 2 to about 200 g/10 min.

4. An article formed from the composition of claim 1.

5. The article of claim 4, wherein the article is a compression molded cap, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

6. The article of claim 4, wherein the article is a compression molded closure, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

7. A composition comprising:
(i) a virgin resin having a first polyolefin;
(ii) a post-consumer recycled resin having a second polyolefin;
(iii) a polypropylene-based compatibilizer, wherein the polypropylene-based compatibilizer comprises:
  (A) a semi-crystalline matrix comprising from about 25 to 50%, by weight, of a crystalline propylene homopolymer with a solubility in xylene at room temperature of less than or equal to 4%, or a crystalline copolymer of propylene with ethylene or a $C_4$-$C_8$ alpha-olefin having an ethylene or alpha-olefin content 0.5 to 3%, and a solubility in xylene at room temperature of from less than or equal to 4%; and,
  (B) a rubber comprising from about 50 to 75%, by weight, of a partially amorphous copolymer of ethylene with a $C_4$-$C_8$ alpha-olefin, wherein the alpha-olefin content is from about 10 to 20%, and the copolymer is from about 10 to 40% soluble in xylene at room temperature.

8. The composition of claim 7, wherein a flexural modulus of the composition is between about 155 to about 300 kPSI, wherein a notched Izod Impact at 73° F. of the composition is between about 0.4 to about 12 ft-lb/in, and wherein flexural modulus/notched Izod Impact values range from about 10 to about 650 kpsi/ft-lb/in.

9. The composition of claim 7, wherein the MFR of (i) is from about 2 to about 200 g/10 min.

10. An article formed from the composition of claim 7.

11. The article of claim 10, wherein the article is a compression molded cap, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

12. The article of claim 10, wherein the article is a compression molded closure, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

13. A composition comprising:
(i) a virgin resin having a first polyolefin, wherein the virgin resin has a flexural modulus ranging from 240 to 300 kpsi, a tensile strength at yield ranging from 2800 psi to about 6200 psi, and an elongation at yield ranging from 5 to 9%;
(ii) a post-consumer recycled resin having a second polyolefin;
(iii) a polypropylene-based compatibilizer, wherein the polypropylene-based compatibilizer comprises:
  (A) a semi-crystalline matrix comprising from about 50 to 80%, by weight, of a crystalline propylene homopolymer with a solubility in xylene at room temperature of between 1 to 3%; and,
  (B) a rubber comprising from about 20 to 50%, by weight, a partially amorphous copolymer of ethylene with propylene, wherein the ethylene content is from about 20 and less than 100%, and the copolymer has an intrinsic viscosity of the xylene soluble fraction from about 2 to 5 dl/g (in decalin).

14. The composition of claim 13, wherein a flexural modulus of the composition is between about 155 to about 300 kPSI, wherein a notched Izod Impact at 73° F. of the composition is between about 0.4 to about 12 ft-lb/in, and wherein flexural modulus/notched Izod Impact values range from about 10 to about 650 kpsi/ft-lb/in.

15. The composition of claim 13, wherein the MFR of (i) is from about 2 to about 200 g/10 min.

16. An article formed from the composition of claim 13.

17. The article of claim 16, wherein the article is a compression molded cap, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

18. The article of claim 16, wherein the article is a compression molded closure, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

19. A composition comprising:
(i) a virgin resin having a first polyolefin;
(ii) a post-consumer recycled resin having a second polyolefin;
(iii) a polypropylene-based compatibilizer, wherein the polypropylene-based compatibilizer comprises:
  (A) a semi-crystalline matrix comprising:
    AI) from about 25 to 75%, by weight, of a crystalline propylene homopolymer with a solubility in xylene at room temperature of less than 3%, and a MFR between 2 and 20 g/10 min; and
    AII) from about 5 to 40%, by weight, of a crystalline propylene homopolymer with a MFR between 40 and 140 g/10 min; and
  (B) a rubber comprising from about 5 to 50%, by weight, a partially amorphous copolymer of ethylene with propylene, wherein the ethylene content is from about 20 to 100%, and the copolymer has an intrinsic viscosity of the xylene soluble fraction from about 2 to 4 dl/g (in decalin).

20. The composition of claim 19, wherein a flexural modulus of the composition is between about 155 to about 300 kPSI, wherein a notched Izod Impact at 73° F. of the composition is between about 0.4 to about 12 ft-lb/in, and wherein flexural modulus/notched Izod Impact values range from about 10 to about 650 kpsi/ft-lb/in.

21. The composition of claim 19, wherein the MFR of (i) is from about 2 to about 200 g/10 min.

22. An article formed from the composition of claim 19.

23. The article of claim 22, wherein the article is a compression molded cap, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

24. The article of claim 22, wherein the article is a compression molded closure, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

25. A composition comprising:
   (i) a virgin resin having a first polyolefin;
   (ii) a post-consumer recycled resin having a second polyolefin;
   (iii) a polypropylene-based compatibilizer, wherein the polypropylene-based compatibilizer comprises:
      (A) a semi-crystalline matrix comprising:
         AI) from about 25 to 75%, by weight, of a crystalline propylene homopolymer with a solubility in xylene at room temperature of 2 to 4%, and a MFR between 60 and 160 g/10 min;
         AII) from about 5 to 40%, by weight, of a high density polyethylene with a MFR between 40 and 140 g/10 min; and
      (B) a rubber comprising from about 5 to 50%, by weight, a partially amorphous copolymer of ethylene with propylene, wherein the ethylene content is from about 20 to 100%, and the copolymer has an intrinsic viscosity of the xylene soluble fraction from about 2 to 4 dl/g (in decalin).

26. The composition of claim 25, wherein a flexural modulus of the composition is between about 155 to about 300 kPSI, wherein a notched Izod Impact at 73° F. of the composition is between about 0.4 to about 12 ft-lb/in, and wherein flexural modulus/notched Izod Impact values range from about 10 to about 650 kpsi/ft-lb/in.

27. The composition of claim 25, wherein the MFR of (i) is from about 2 to about 200 g/10 min.

28. An article formed from the composition of claim 25.

29. The article of claim 28, wherein the article is a compression molded cap, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

30. The article of claim 28, wherein the article is a compression molded closure, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

31. A composition comprising:
   (i) a virgin resin having a first polyolefin;
   (ii) a post-consumer recycled resin having a second polyolefin;
   (iii) a polypropylene-based compatibilizer, wherein the polypropylene-based compatibilizer comprises:
      (A) a semi-crystalline matrix comprising:
         AI) from 25% to 75%, by weight, based upon the total weight of (A), of a propylene homopolymer having a melt flow rate MFRI of 1.2 g/10 min; and
         AII) from 25% to 75% by weight, based upon the total weight of (A), of a propylene homopolymer having a melt flow rate value MFRII of 73 g/10 min; wherein the ratio MFRII/MFRI is 60; and
      (B) a rubber comprising a copolymer of ethylene and butene, wherein the copolymer is 36% ethylene.

32. The composition of claim 31, wherein a flexural modulus of the composition is between about 155 to about 300 kPSI, wherein a notched Izod Impact at 73° F. of the composition is between about 0.4 to about 12 ft-lb/in, and wherein flexural modulus/notched Izod Impact values range from about 10 to about 650 kpsi/ft-lb/in.

33. The composition of claim 31, wherein the MFR of (i) is from about 2 to about 200 g/10 min.

34. An article formed from the composition of claim 31.

35. The article of claim 34, wherein the article is a compression molded cap, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

36. The article of claim 34, wherein the article is a compression molded closure, wherein the composition has a first melt flow rate and a first die swell ratio at a given shear rate, wherein the first melt flow rate is within 10% of a second melt flow rate of a virgin HDPE, and wherein the first die swell ratio at a given shear rate is from 0% to 25% less than a second die swell ratio at a given shear rate of the virgin HDPE, wherein the second melt flow rate and the second die swell ratio at a given shear rate are values of the same HDPE.

* * * * *

UNITED STATES PATENT AND TRADEMARK OFFICE
CERTIFICATE OF CORRECTION

PATENT NO. : 11,753,534 B2
APPLICATION NO. : 17/527949
DATED : September 12, 2023
INVENTOR(S) : Briggs et al.

Page 1 of 1

It is certified that error appears in the above-identified patent and that said Letters Patent is hereby corrected as shown below:

In the Specification

In Column 17, Line 11, delete "[ii]" and insert -- [η] --, therefor

Signed and Sealed this
Fourth Day of February, 2025

Coke Morgan Stewart
*Acting Director of the United States Patent and Trademark Office*